Patented Aug. 8, 1950

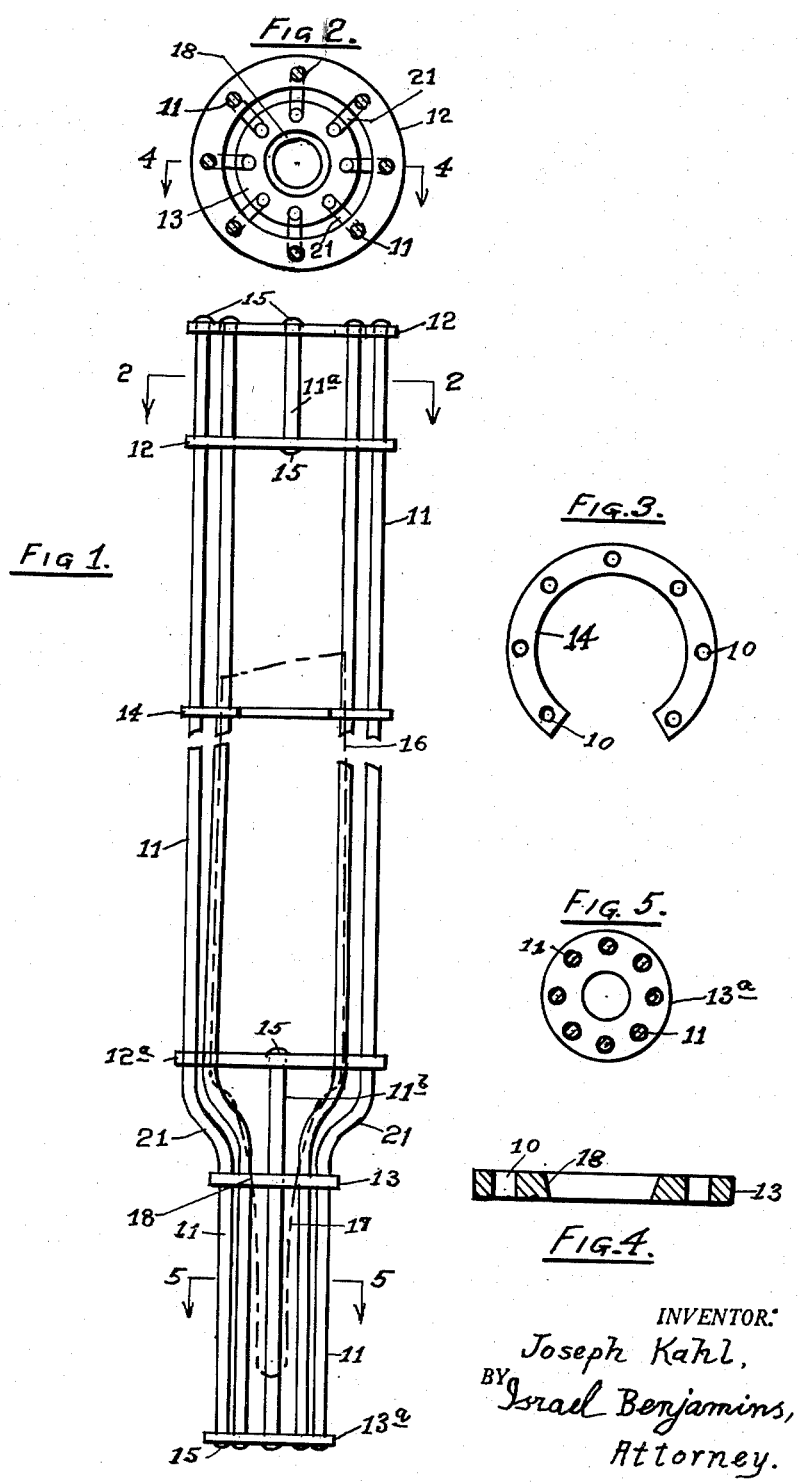

2,517,674

UNITED STATES PATENT OFFICE 2,517,674

PROTECTING CAGE FOR GLASS TUBES

Joseph Kahl, New York, N. Y.

Application February 27, 1948, Serial No. 11,705

2 Claims. (Cl. 73—374)

My invention relates to improvements in a protecting cage for glass tubes, such as used for enclosing scales for thermometers, and it consists in the novel features which are hereinafter described.

One of the objects of my invention is to simplify the construction of the cages thereby reducing the cost of labor.

Another object is to facilitate the assembling of the cages and to reduce the number of parts of the same.

A further object is to improve the appearance of the cages.

A still other object is to increase the strength of the cages and their resistance to pressure in a direction from the outside towards the inside of the cages.

Another object is to provide circular seats for the tapered stems of the said glass tubes at the waistline of the cages.

Other objects and advantages will hereinafter appear.

I attain these objects by the protecting cage for glass tubes which is illustrated in the accompanying drawings or by an mechanical equivalent or obvious modification of the same.

In the drawings—

Fig. 1 is a fragmentary front elevation of my protecting cage for glass tubes, omitting the cover and hanger at the upper end thereof.

Figure 2 is a section in plan view on the line 2—2 of Fig. 1.

Figure 3 is a detail in plan view of a horse-shoe shaped flat rib forming part of my improved cage which is hereinafter described.

Figure 4 is a detail in cross section on the line 4—4 of Fig. 2 of the hereinafter described waistline rib of my protecting cage; and Figure 5 is a section in plan view of the line 5—5 of Fig. 1. Fig. 4 is drawn to a larger scale than the other figures on the drawing.

Similar numerals refer to similar parts throughout the several views.

11, 11a, and 11b are vertically disposed cage-rods which are secured to each other and kept in position by horizontally disposed flat ribs 12, 12a, 13, 13a, and 14; the ribs 12, 12a, 13 and 13a are annular in shape; the rib 14 is horse-shoe shaped as shown in Fig. 3.

The rods 11 are continuous from end to end of the cage and are bent at 21 near their lower ends to a double curvature in a way to reduce the transverse size of the lower end of the cage; one of the rods 11 is omitted at the front of the cage to facilitate the reading of the scale and is replaced by the short rods 11a and 11b near the upper and the lower ends of the cage respectively.

The part of the rods 11 and 11a at the upper end of the cage are kept in position by two annular flat ribs 12; the rods 11 at the intermediate part of the cage are kept in position by the horseshoe shaped flat rib 14; the parts of the rods 11 above and near the bends 21 are kept in position by the flat rib 12a; the rods 11 at the waistline of the cage below and near the bends 21 are kept in position by the flat rib 13; and the lower ends of the rods 11 are kept in position by the flat rib 13a.

The rod 11b is kept in position by the flat ribs 12a, 13 and 13a.

The ends of the rods 11, 11a and 11b are riveted as at 15 over the flat ribs 12, 12a. and 13a.

All of the flat ribs may be shrunk on to the rods of the cage or otherwise secured thereto.

As shown in Figs. 2, 3, and 5, the rods pass through openings in intermediate parts of the flat ribs leaving a margin or flange on each of the flat ribs inside as well as outside of the rods; the ribs thereby resist deflection of the rods by any force acting in a radial direction outwardly as well as inwardly of the cage.

A fragment of a relatively large glass tube for holding therein a thermometer scale and a relatively small thermometer tube is shown in broken lines at 16 in Fig. 1.

The glass tube 16 terminates at the lower end thereof in a tapered stem 17 which is supported by the flat ring or rib 13 which is provided with a circular seat as at 18 in Fig. 4.

In cheaper outfits the seat 18 may be omitted and the stem 17 supported by the inner edge of the opening of the rib 13 which may be rounded off in cross-section if desired.

Variations are possible and parts of my invention may be used without other parts.

I claim as my invention and desire to secure by Letters Patent:

1. In a protecting cage for a glass tube, annular flat ribs and horseshoe shaped flat ribs, said ribs having therein openings arranged in a center line passing through the intermediate parts thereof, continuous rods and fragmentary rods having their intermediate portions omitted to allow a better view of said tube, said rods being arranged around a space for receiving said tube, the continuous rods passing through the openings in all of said ribs and being secured thereto, and the fragmentary rods passing at their ends through the openings in the annular ribs and being secured thereto, the said horseshoe shaped ribs allowing the omission of the intermediate portions of the fragmentary rods without unduly weakening the structure of the cage.

2. In a protecting cage for a glass tube, horizontally disposed annular ribs having therein openings arranged on a center line passing through the intermediate parts thereof, said tube terminating at the lower end thereof in a tapered and relatively narrow stem, rods which have substantially vertical upper and lower ends passing through said openings and being secured at their ends to the ribs which are adjacent to said ends, said rods being bent through a double curvature intermediate their vertical parts to fit the shape of the tube and stem, and a circular support for said stem on said rods at the points of double curvature thereof.

JOSEPH KAHL.

REFERENCES CITED

The following references are of record in the file of this patent:

UNITED STATES PATENTS

| Number | Name | Date |
|---|---|---|
| 284,774 | Stevens et al. | Sept. 11, 1883 |
| 924,276 | Roesch | June 8, 1909 |
| 1,119,627 | Mueller et al. | Dec. 1, 1914 |